United States Patent [19]

Yan

[11] Patent Number: 5,060,728
[45] Date of Patent: Oct. 29, 1991

[54] PROCESS FOR PREVENTING SCALE FORMATION IN OIL WELLS

[75] Inventor: Tsoung Y. Yan, Philadelphia, Pa.

[73] Assignee: Mobil Oil Corp., Fairfax, Va.

[21] Appl. No.: 592,382

[22] Filed: Oct. 3, 1990

Related U.S. Application Data

[63] Continuation-in-part of Ser. No. 256,683, Oct. 12, 1988, abandoned.

[51] Int. Cl.[5] ............................................. E21B 43/12
[52] U.S. Cl. .................................... 166/279; 166/310; 252/8.552
[58] Field of Search ............... 166/279, 310, 371, 902; 252/8.552

[56] References Cited

U.S. PATENT DOCUMENTS

| | | | |
|---|---|---|---|
| 3,704,750 | 12/1972 | Miles et al. | 166/279 |
| 3,827,977 | 8/1974 | Miles et al. | 252/8.552 |
| 4,518,511 | 5/1985 | Kaufman et al. | 166/279 X |
| 4,710,303 | 12/1987 | Emmons | 252/8.555 |
| 4,779,679 | 10/1988 | Snavely, Jr. et al. | 166/279 |
| 4,787,455 | 11/1988 | Snavely, Jr. et al. | 166/279 |
| 4,947,934 | 8/1990 | Hen | 166/279 |

OTHER PUBLICATIONS

Journal of Petroleum Technology, K. O. Meyers; Jun. 1985; 1019–1034.

Primary Examiner—George A. Suchfield
Attorney, Agent, or Firm—Alexander J. McKillop; Charles J. Speciale; Malcolm D. Keen

[57] ABSTRACT

Wells producing oil and gas are treated with formation waters containing selected time-release scale inhibitors to reduce the deposit of scale in the wellbore and within the formation. The inhibitors are formed by cross-linking a polyacrylic acid compound of controlled molecular wright from about 1,000 to 10,000 with trivalent chromium cations to produce a water-soluble complex which progressively releases the inhibitor from the formation over an extended period of time.

12 Claims, 6 Drawing Sheets

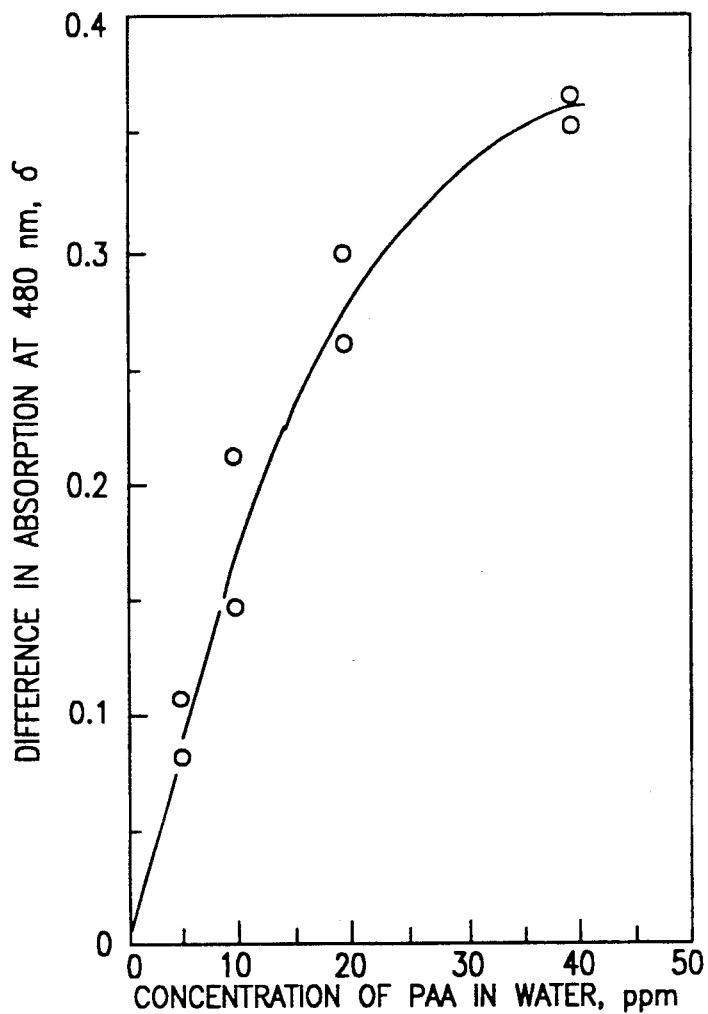
FIG. 5
FIG. 6
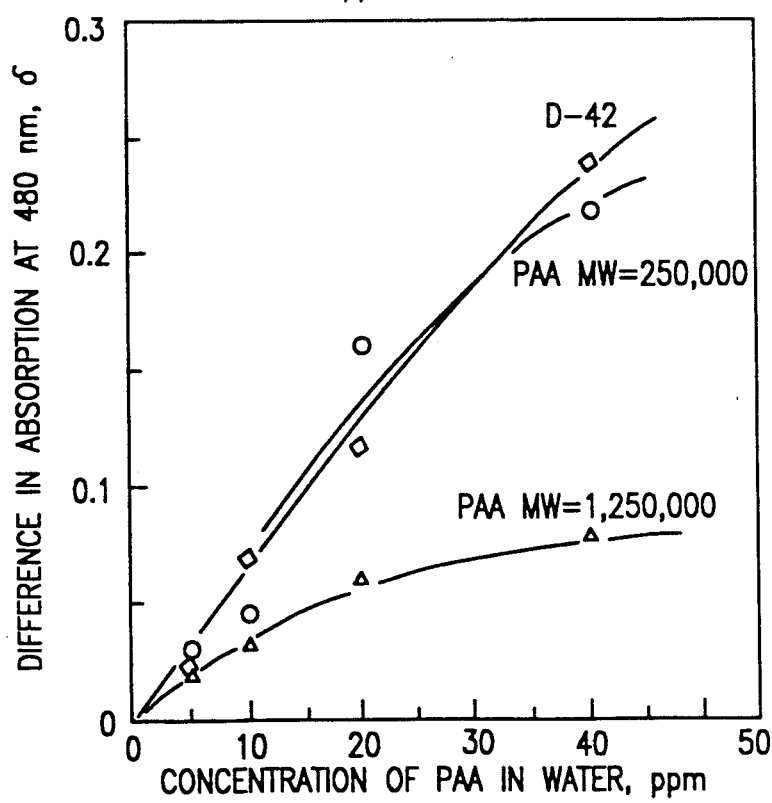

PROCESS FOR PREVENTING SCALE FORMATION IN OIL WELLS

CROSS REFERENCE TO RELATED APPLICATIONS

This application is a continuation-in-part of my prior application Ser. No. 07/256,683, filed Oct. 12, 1988, now abandoned.

FIELD OF THE INVENTION

This invention relates to the prevention of scale formation, particularly deposits of barium sulfate, around the boreholes of oil and gas producing wells. More specifically, this invention relates to improved methods of injecting these chemicals into the subterranean formations through which underground water migrates.

BACKGROUND OF THE INVENTION

In the production of oil and gas from oil and gas wells salt water ordinarily is also produced. The water often contains high levels of scale-forming ions which tend to precipitate and form scale, particularly at points where chemical compositions and physical conditions abruptly change, as in going from the formation into the wellbore. The result can be the formation of large quantities of scale and precipitated salts which plug the formation near the well bore and restrict the flow of oil and gas therefrom. Scale also forms upon well casing and tubing, surface storage and processing equipment such as pipes, valves, heating coils and tubes, separators, etc. associated with handling of the liquids. When scale is formed, the production rate decreases and ultimately, the whole operation ceases. Reduced heat transfer capability is also another bad effect.

In many oil fields, particularly in the North Sea, the most troublesome scales are barium and strontium sulfates. Once a deposit of these is formed, their removal is difficult and costly even to regain near the original production rate. One approach to solving this problem is to shut in the production well and to soak the well with chemicals, such as the sodium salt of diethylenetriaminepentaacetic acid which dissolves or chelates the barium ion for removal. The treating process requires about one week to perform and must be repeated frequently. The treatment is not only costly but also results in lost oil production and corresponding revenue.

A technique for the inhibition of scale formation is disclosed in Meyers, J. Pet. Tech., June 1985, 1019–1034. Meyers discloses the use of scale inhibitors which are squeezed into the formation where they are adsorbed onto the reservoir rock after which the inhibitor is desorbed from the rock into the produced brine as the treated well is produced and refers to retention of the inhibitor by precipitation with divalent cations such as iron and calcium and notes that precipitation in this way may increase inhibitor retention and reduce the permeability in the region of the well bore. Meyers mentions phosphonates and polyacrylates as scale inhibitors (page 120) but does n however, refer to the possibility of using cross-linked scale inhibiting compositions.

Miles U.S. Pat. No. 3,704,750 discloses a method for introducing a scale inhibitor in to oil well brines by injecting a brine insoluble polyvalent metal salt of the inhibitor into the formation adjacent to the wellbore. The inhibitors which may be used include polyacrylic acid having a molecular weight range of about 17,000 to 50,000 and the metals which may be used to form the insoluble salts include trivalent chromium. An essentially similar disclosure is found in U.S. Pat. No. 3,827,977 the '977 reference. In each case, Miles relies on the use of insoluble metal salts e.g. chromium salts. It has been found that insoluble materials similar to Miles' metal salts which include large amounts of chromium are not adsorbed so readily onto the formation with the result that formation permeability in the region of the wellbore is reduced (as noted by Meyers) and time release characteristics i.e. release of the inhibitor over an extended period of time, are lost.

Emmons U.S. Pat. No. 4,710,303 discloses a method of preventing the formation of barium sulfate scale by the use of low molecular weight polyvinylsulfonates.

U.S. Pat. No. 4,787,455 (Snavely) recognizes the desirability of slow release of the corrosion inhibitor and discloses the use of polyacrylic acids as scale and corrosion inhibitors without, however, recognizing the desirability of using trivalent chromium as a cross-linking agent for the complex.

Kaufman, U.S. Pat. No. 4,518,511 discloses the use of oil based antiprecipitant formulations and discloses the use of emulsified polymeric antiprecipitating compositions based on low molecular weight polymers including acrylates for use in oil well treatment but this patent does not deal with water soluble materials for providing time release characteristics.

A primary object of the present invention is to provide an improved method for preventing the deposit of scale, particularly magnesium, barium and calcium, in oil and gas wells. The present method employs water-soluble complexes of chromium and polyacrylic acids which are capable of undergoing a progressive release of the effective scale inhibitor over extended periods of time. The present method uses a relatively low range of molecular weights to ensure that the inhibitor is water-soluble and, in addition, uses a relatively smaller amount of chromium so as to form a complex rather than a salt of the acid as in the Meyers process.

SUMMARY OF THE INVENTION

This invention comprises a process wherein a selected inhibitor for preventing scale formation is mixed with compatible formation water and the mixture is injected into the formation opposite the wellbore face through which oil or gas ordinarily is recovered. The scale inhibitor is selected for its time-release characteristics, that is, its ability to be adsorbed onto formation clay and sand and to be released in effective scale inhibiting concentrations to water moving through the formation. Injection of the formation water/inhibitor mixture is continued until a desired volume has been injected, i.e., the water has reached a distance of 20 to 100 feet radially from the production wellbore. Injection of the formation water/inhibitor mixture is suspended. Injection then is begun of untreated formation water until a volume of between 10 and 200% of the volume initially injected treated water has been injected. The inhibitor is preferably injected at a concentration of from 10 to 100,000 ppmw. The chemical inhibitors dispersed in the original volume of injected water are thus distributed within the producing formation in the critical area around the formation and adsorbed onto the clay. After this injection step, oil production is resumed by reversing the flow in the formation, i.e., by producing water and oil from the production wells in the usual way.

The scale forming inhibitors which are used in the present process are time-release, long lasting materials comprising a cross-linked complex of a controlled molecular weight polyacrylic acid (PAA) in which trivalent chromium is used as the cross-linking agent. These inhibitors are designed to release effective components for scale inhibiting at controlled rate over a period of time (time releasing) leading to long lasting inhibitive effect.

DETAILED DESCRIPTION

Figure 1:
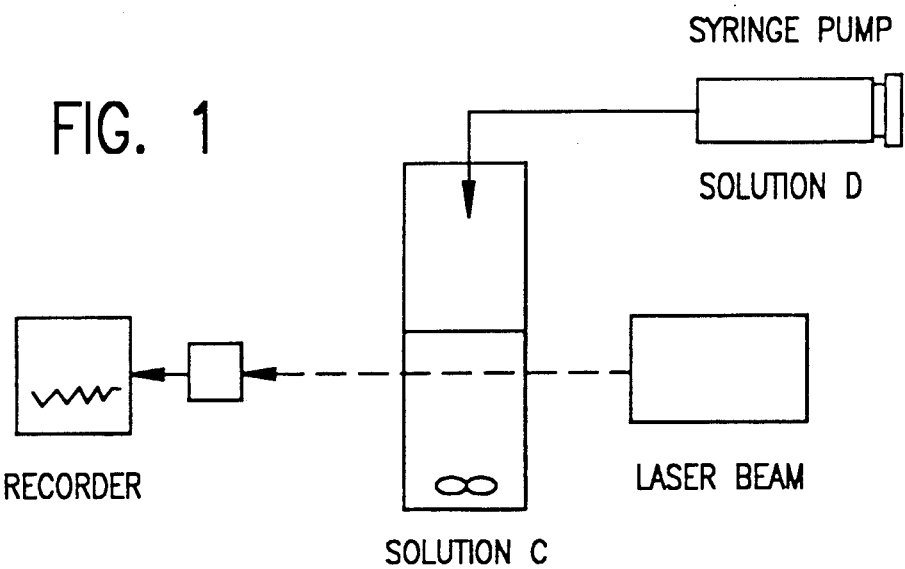
FIG. 1 is a diagram of optical-electronic apparatus used to determine the effectiveness of a selected deposit inhibitor.

Method of Injecting Inhibitor into the Formation

This invention provides an improved method for inhibiting the formation of scale, particularly, $BaSO_4$ in the formation around the well, the perforations, the well tubing and pumps. Through this treatment, an acceptable production rate can be maintained for extended periods of time and production need not be interrupted to dissolve these undesired scale deposits if the method of this invention is followed.

The preferred method of injecting scale inhibiting composition is based on countercurrent injection, i.e., down-well injection in an opposite direction to the ordinary flow pattern of oil and water through the formation into the wellbore. In this method after the initial cleaning and isolation of the wellbore, formation water (brine) containing between about 0.1 and about 20 percent of the selected scale inhibitor is injected downhole into the production well. The injection is continued until a total volume has been injected which is equivalent to a front extending between 20 and 100 feet from the production wellbore. The amount of inhibitor injected is preferably from about 10 to 100,000 ppmw of the inhibitor. Amounts of from about 1-10 ppm have been found to be highly effective. The actual volume injected will, of course, depend on the thickness of the pay zone, the intervals of perforations in the wellbore, and well spacing.

Subsequent to this initial injection of formation water containing inhibitor, formation water absent any sort of added inhibitor is injected downhole until about twice the amount (20 to 200% of the previously injected volume) has been effected. This second injection of untreated formation water is optional and serves to disperse further throughout the formation the chemical inhibitor previously injected. After this injection step, oil or gas production is resumed by injecting water at the normal injection wells and allowing oil to flow through the formation and to be produced from the production wells in the usual way. Depending upon the concentration of inhibitor in the injected formation water, this treatment can last for between one and twelve months at high production rates.

Scale Deposition Inhibitors

The polyacrylic acid (PAA) chemical inhibitors found to be useful in this particular method include the polyacrylic acid compounds such as the ester form, with a controlled molecular weight range up to about 15,000, normally from at least 1,000 and preferably in the range 4,000 to 8,000, with best results being obtained with a molecular weight of about 5,000. The use of PAA materials as the basis for the scale inhibition compositions ensures, when the PAA is cross-liked with a controlled amount of the trivalent chromium, that a water-soluble time-release inhibitor results. It has been found that the use of the water-soluble complexes is highly desirable since if attempts are made to use insoluble materials, the scale inhibition is much less effective: the complex does not penetrate the subsurface formations as readily and is not as readily absorbed onto the formation, with the result that the desired long term, time release of the inhibitor is not obtained. Use of the trivalent chromium ions has been found to represent the best method of carrying out the process since cross-linking with chromium forms labile complex compounds which are readily adsorbed onto the subsurface formations but which are subject to decomposition over extended periods of time, to release the monomer as a scale inhibitor. Chromium is unique in forming cross-linkages which are initially stable but which are progressively degraded under the downhole conditions but which permit the complex to be formed on the surface in a controlled, reproducable manner. The chromium is capable of complexing at a rapid rate at high pH values, unlike other materials which require specific conditions for formation of the complex.

In order to determine the effectiveness of an inhibitor a titrimetric method was developed which is particularly useful with reference to barium. To conduct the test a known quantity of sodium sulfate and of the inhibitor under investigation is added to a measured volume of an aqueous solution of sodium chloride of a concentration equivalent to that of a typical oil well brine. The solution is placed in the path of a laser beam and the optical density of the solution is recorded. An additional volume of the same sodium chloride solution, absent any added sulfate ion but containing a known concentration of barium ion, such as dissolved barium chloride, is then slowly metered into the first portion of solution as the mixture is continually agitated. The optical density of the solution is continually recorded as the turbidity of the solution increases due to the formation of precipitated barium sulfate. The time in minutes required to reach a predetermined opacity of the solution compared to similar tests with other inhibitor compounds under identical conditions is a measure of the effectiveness of the particular inhibitor in question. The apparent solubility product at which precipitation occurs is also calculated. The greater the apparent solubility product is the greater the effectiveness of the inhibitor is. FIG. 1 provides a diagrammatic sketch of the apparatus described above and FIG. 2 represents a typical plot obtained.

As well as being effective as a scale inhibitor, the chemical inhibitor selected for this process must have a proper affinity and interaction with clay in the formation. If the interaction is not sufficiently strong, rapid washout and loss of effectiveness occurs quickly. If, however, adsorption is too strong, the inhibitor is is not released to the migrating salt water in the formation and is ineffective. The inhibitor thus must be tailored to fit the particular use planned. The affinity of a particular clay for a particular inhibitor can be determined by a series of tests in which solutions of varied concentrations of inhibitor in a simulated oil field brine are contacted with measured amounts of clay for a time period sufficient to establish equilibrium between the two phases. The brine solution is then filtered to remove the clay and analyzed for content of inhibitor. A material balance calculation readily shows the amount of inhibitor adsorbed by the clay which would be in equilibrium with the solution in the formation. A plot then of equilibrium concentration on the clay versus concentration in the formation water provides a profile of the inhibitor's effectiveness in the formation. An example of the procedure is provided below in Example 2 in which polyacrylic acid is the scale inhibiting agent.

Low molecular weight polyacrylic acids (PAA) with molecular weights below about 1,000 are effective $BaSO_4$ inhibitors but interact too weakly with clay to be effective as slow-releasing squeeze treating agents. High molecular weight PAA (molecular weight above about 17,000) interacts strongly with clay but is ineffective as $BaSO_4$ inhibitors and tends to form materials which, upon cross-linking are insoluble in water and therefore cannot be readily injected into the formation. A new type of slow-releasing squeeze treating agent has been devised. It provides the effectiveness of the low molecular weight PAA as a scale inhibitor and simultaneously the retention of the high molecular weight PAA on the formation sand and clay after being adsorbed. The agent is obtained by crosslinking a controlled molecular weight PAA to increase its interaction with clay. After injection, the labile crosslinking bonds break and slowly release effective concentrations of low molecular weight PAA.

In studies with Berea sand it was discovered that crosslinking with trivalent chromium cations is effective in increasing the interaction of PAA with clay in the Berea sand to a desired level and that the crosslinking alters the adsorption isotherms of PAA to improve its time release characteristics. The adsorptions of the crosslinked PAA within the preferred MW range of 2000–5000 remains fairly constant.

The most preferred inhibitor for use in this invention is polyacrylic acid (PAA) of a molecular weight between 1000 and 5,000 which has been reacted with crosslinking and complexing agents to form polyacrylic acid complexes with controlled molecular weight ranges. Typical PAA compositions which can be used include a polyacrylic acid Na salt MW 2100 and a polyacrylic acid Na salt of MW 6000. The linkage chosen is one chosen to be weaker than the backbone of the polyacrylic acid molecule. When the formation water containing the dissolved polyacrylic acid complex is injected and passed through the formation, the PAA complex is strongly adsorbed in a large quantity. The formation is thus able to store a large quantity of the PAA complex so that the treating frequency required is greatly reduced. Under the conditions in the formation the polyacrylic acid complex decomposes at the weak linkages at a desired rate and thus effects release of the PAA molecules of the most effective size for scale inhibition for an extended period of time.

CROSS-LINKING WITH TRIVALENT CHROMIUM IONS

By reacting the PAA with controlled amounts of the trivalent chromium ions, metal complexes are formed due to the reaction of trivalent chrome and carboxyl groups. These complexes can be preferentially and slowly degraded at the pH and temperature conditions underground. The mole ratio of chromium ion to PAA can range between 0.5 and about 20 and in order to produce the complexes with the desired molecular weight range, the amount of trivalent chromium cations relative to the PAA should be in the range of 0.01 to 0.5 equivalents of chromium per equivalent of PAA, preferably from about 0.05 to 0.3 equiv/equiv.

The pH of the solution must be approximately netral in order to prevent the formation of precipitates prior to injection into the formation. Normally, pH values of about 5.5–8.0, preferably about 6.5–7.5 are suitable for the solution prior to injection. Use of the correct pH ensures that the chromium is maintained in complexed form and prevents wash-back of dissolved chromium species from the formation as well as plugging of the formation in the immediate vicinity of the borehole. The solution which is injected into the formation should have a viscosity of no more than about 50 cP, preferably no more than about 10 cP. A concentrated solution of cross-liked complex can be made up and diluted with formation water to the desired viscosity for the actual injection into the formation. The concentrate should preferably contain no more than about 50 weight percent of the dissolved complex.

EXAMPLE 1

Figure 2:
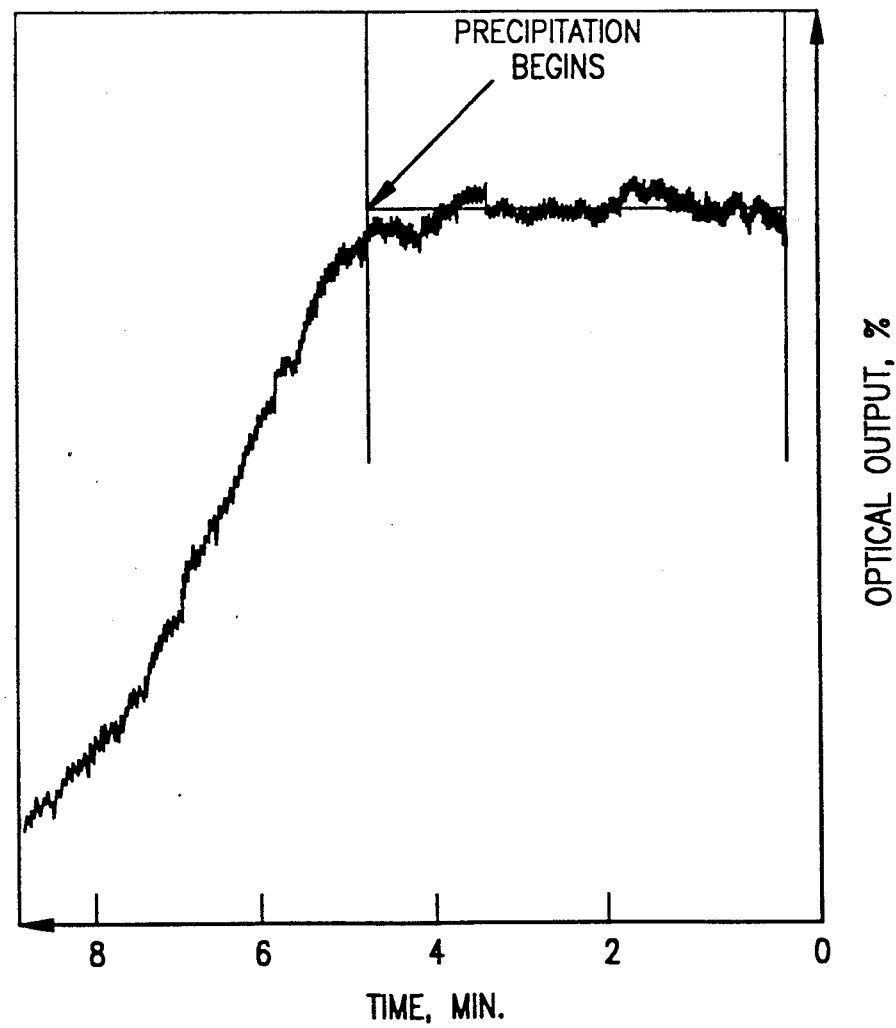
FIG. 2 is a sample plot showing the decrease in translucence when a light beam is transmitted through an aqueous solution of sulfate ions to which a solution containing barium ions is being systematically added.

A solution of 58.5 grams of NaCl and 2.84 grams of $Na_2SO_4$ in one liter of water was prepared, designated as Solution "C" and set aside. A similar solution of 58.5 grams of NaCl and 0.416 grams of barium chloride, $BaCl_2$, was prepared and designated as Solution "D". Solution "D" simulated an oil field formation water. The inhibitors to be measured were added to solution "C" in predetermined concentrations. A test tube containing 20 ml of Solution "C", with the desired level of the inhibitor and a magnetic stirrer was placed in the path of a laser beam and the optical density recorded (FIG. 1). A syringe pump was employed to pump the Solution "D" into the test tube at 1 ml/minute. the optical density was recorded. A typical output is shown in FIG. 2. The turbidity due to formation of barium sulfate is shown as a rapid loss in optical output. the time it takes for this to occur, t, min, is the indication of the effectiveness of the inhibitor. The longer the time the more effective the inhibitor is. The apparent solubility products at which precipitation occurred were also calculated. The greater the apparent solubility product, the more effective the inhibitor was. The results of several tests are shown in Table 1.

TABLE 1

Effect of Inhibitors on BaSO4 Scale Formation
Solution in tube: "C", 20 cc
Solution in syringe: "D"
Solution pumping rate, cc/min: 1

| | Run No. | | | | | | | | | |
|---|---|---|---|---|---|---|---|---|---|---|
| | 100 | 101 | 102 | 103 | 104 | 105 | 106 | 107 | 109 | 110 |
| Inhibitor type | | SP-178 | | | | | PAA MW 5,000 | | PAA MW 2,000 | |
| Init. Conc., ppm* | 0 | 2.43 | 4.76 | 9.09 | 13.04 | 0.99 | 2.43 | 4.75 | 0.99 | 2.43 |
| Final Conc., ppm | 0 | 2.03 | 3.97 | 7.43 | 10.60 | 0.75 | 1.28 | — | 0.75 | 1.32 |
| Time,** min. | 2.9 | 4.6 | 5.2 | 6.9 | 8.3 | 6.8 | 19.2 | 20 | 6.6 | 17.8 |
| App. Sol Product $(mol/l)^2 \times 10^6$ | 4.40 | 6.08 | 6.55 | 7.63 | 8.29 | 7.57 | 10.0 | — | 7.46 | 9.97 |

Notes:
*Initial inhibitor conc. in solution C before solution D was added.
**Time to turbidity, min, which equals cc of solution added.
SP 178 is a commercially available polyacrylic acid polymer available from Petrolite Chemical Corp. (solution of unknown concentration of the active ingredient).

Figure 3:
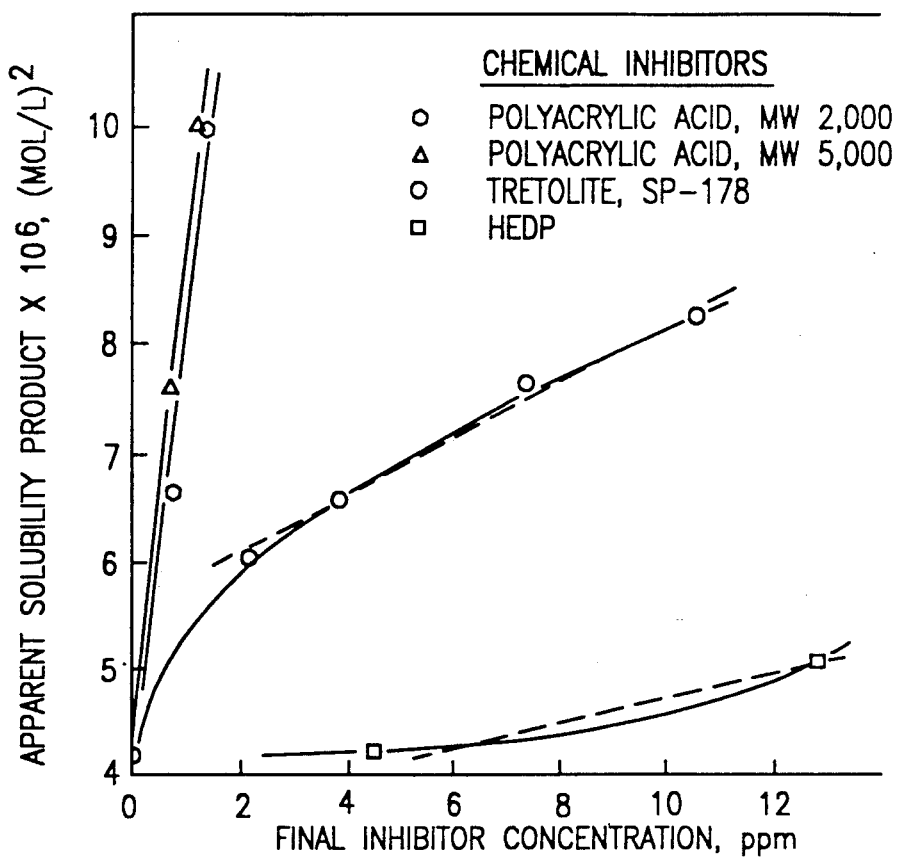
FIG. 3 is a plot of final inhibitor concentrations versus apparent solubility product of barium sulfate in simulated formation water for several deposit inhibitors, FIGS. 4, 5, and 6 and calibration curves for various inhibitors at various concentrations when a light beam is passed through the solution and measured by a colorimeter or spectrophotometer.

The inhibitors tested were all found to be effective in inhibiting BaSO4 scale formation. The large difference in effectiveness among the inhibitors according to this test, indicate that this test is, a sensitive one (FIG. 3). With this test, it is possible to reproduce the "apparent" solubility product within + or − 5% (repeated results are not shown).

The "apparent" solubility products are plotted against the concentrations of the inhibitors in FIG. 3. The slopes of the lines are quantitative expressions of the efficacy of the inhibitors. It is noted that the lines for SP-178 are non-linear, suggesting that its efficacy depends on the dosages and SP-178 seems to level off somewhat. If we can linearize these lines (shown as broken lines in FIG. 3), the slopes are 46, 2.6, 1.0 $(M/l)_2$/ppm.

EXAMPLE 2

This is an example illustrating the determination of adsorption of polyacrylic acid on a Berea sand utilizing a colorimetric method to determine concentrations of PAA.

Polymer solution for testing was prepared by dissolving the polymer sample to the desired level into simulated sea water containing 58.5 and 2.84 grams/liter of NaCl and Na2SO4, respectively. The pH of the solution was adjusted from 3 to 7 using NaOH to simulate conditions more realistically. The NaOH also at the higher pH increased the solubility of polymer in the solution and assured its complete dissolution.

To 90 grams of the test solution, 10 grams of Berea sand was added and agitated for two hours to assure equilibrium adsorption. The mixture was filtered and the concentration of PAA in the filtrate was determined using the Rohm & Haas/HACH method. This method is an adsorption-colorimetric method which detects PAA concentrations in water at levels of 4 parts per million. The test is designed to detect acrylic acid polymers and copolymers with average molecular weights between 800 and 10,000. The adsorption-colorimetric method avoids the problems of other test methods, even in brackish water or brines, by selectively removing the polymer from the other components in the sample matrix with a reusable liquid chromatographic (LC) cartridge. The PAA is then eluted off the cartridge. The test is completed by the addition of two reagents to the eluant and measurement with a colorimeter or spectrophotometer. The presence of phosphonates, phosphate esters, lignosulfates, benzotriazoles and other chelants, as additives, do not interfere with the test. The procedure was improved by including: (1) an accurate control of sample pH at 2.5 and (2) flushing the cartridge with water at pH 2 before elution of the sample. Calibration curves were constructed for each PAA by plotting the adsorption intensity differences between the sample and the blank at 480 nm against the PAA concentration.

The adsorption of PAA on clay was calculated by material balance. The concentrations of PAA on the clay and in the solutions were used to construct the equilibrium adsorption isotherm.

Figure 4:
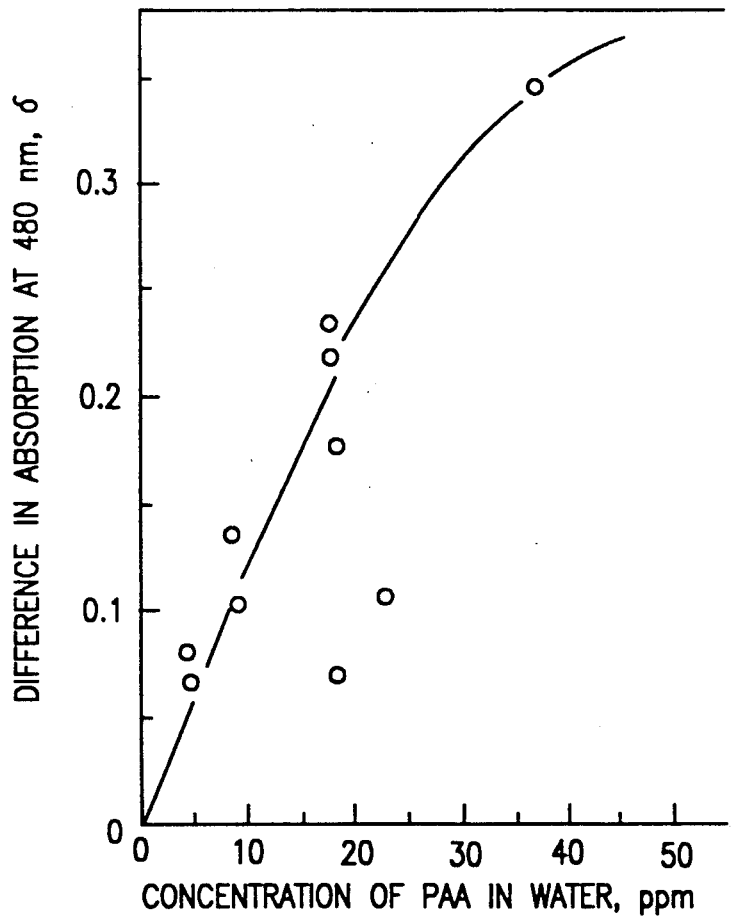
Figure 7:
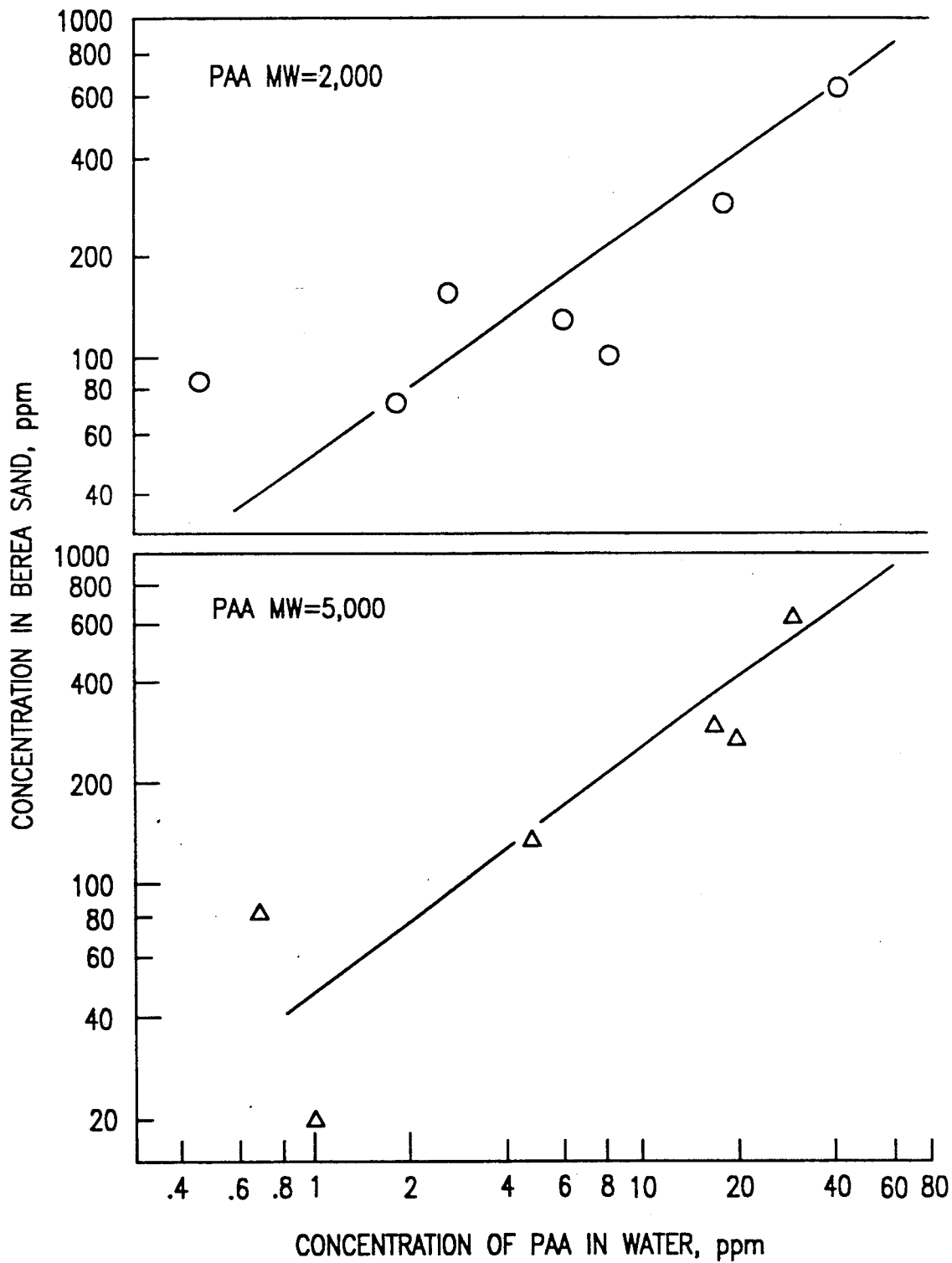
FIGS. 7 and 8 are plots of equilibrium concentrations between formation sand and formation water for several deposit inhibitors.
Figure 8:
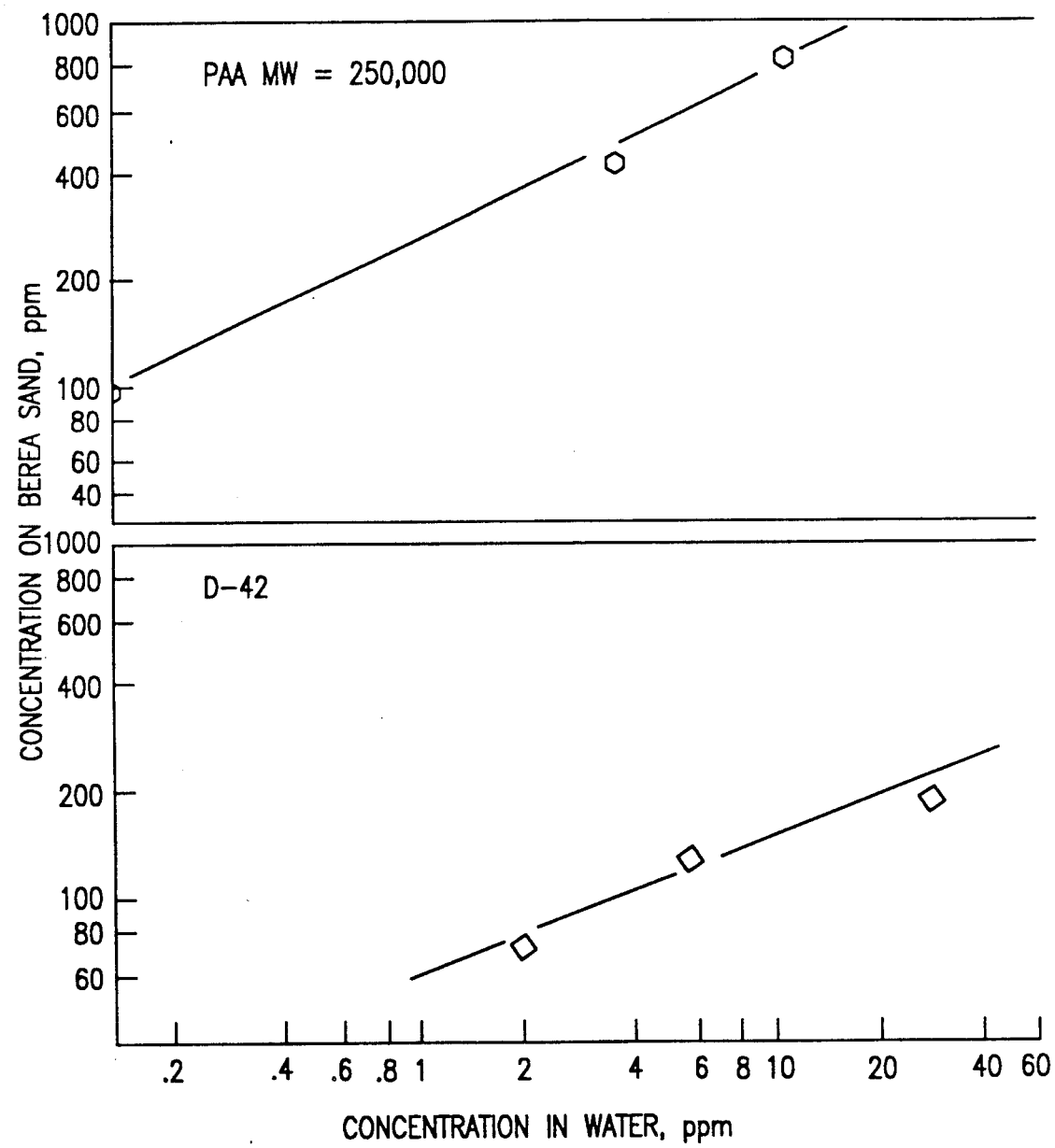

The concentration calibration curves for PAA MW 2,000, PAA MW 5,000, and PAA MW 250,000, PAA MW 1,250,000 and Marlex D-42 are shown in FIGS. 4, 5, and 6. Narlex D-42 has a molecular weight of 5,000 to 8,000 and is the polyacrylic acid derivative of diol and is available from National Starch and Chemical Corp., Bridgewater, New Jersey. Results of the adsorption tests on sand are tabulated in Table 2 and presented in graph form in FIGS. 7 and 8.

TABLE 2

Adsorption of PAA on Berea Sand

| Initial Polymer Conc., ppm | Experiment I Conc., ppm | | Experiment II Conc., ppm | | Experiment III Conc., ppm | |
|---|---|---|---|---|---|---|
| | Water | Sand | Water | Sand | Water | Sand |
| PAA MW = 2,000 | | | | | | |
| 10 | 2 | 72 | 0.5 | 85.5 | | |
| 20 | 3 | 153 | 6.5 | 121.5 | 9 | 99 |
| 50 | 20 | 270 | 27.5 | 202.5 | | |
| 100 | 45 | 495 | 36.5 | 571.5 | | |
| PAA MW + 5,000 | | | | | | |
| 10 | — | — | .7 | 83.7 | | |
| 20 | 1 | 171 | 5 | 135.0 | | |
| 50 | 18 | 288 | 20.5 | 265.6 | | |
| 100 | 32 | 612 | 35 | 585.0 | | |
| PAA MW + 250,000 | | | | | | |
| 10 | 0.2 | 90 | | | | |
| 20 | — | — | | | | |
| 50 | 4 | 414 | | | | |
| 100 | 12 | 792 | | | | |
| D-42 | | | | | | |
| 10 | 2 | 72 | | | | |
| 20 | 6 | 126 | 6 | 126 | | |
| 50 | 30 | 180 | — | — | | |

TABLE 2-continued

| Initial Polymer Conc., ppm | Adsorption of PAA on Berea Sand | | | | | |
|---|---|---|---|---|---|---|
| | Experiment I Conc., ppm | | Experiment II Conc., ppm | | Experiment III Conc., ppm | |
| | Water | Sand | Water | Sand | Water | Sand |
| 100 | — | — | — | — | | |

Within the PAA solution concentration of 1-100 ppm, the adsorption isotherm is linear, i.e., the plots of log PAA concentrations on clay and in water are linear (FIGS. 7-8):

$$\ln C_s = K \ln C_w + R \qquad (1)$$

where K and R are constants. The values of K depend on the molecular weight of PAA and the nature of clay.

$C_s$ and $C_w$ are concentrations of PAA on clay and in water, respectively, ppm.

This result is consistent with previously published work for PAA adsorbed on Kaolin clay.

The constants for the PAAs of various molecular weights and Berea sand tested are:

| | K | R |
|---|---|---|
| PAA MW 2,000 | 1.5061 | 3.8502 |
| PAA MW 5,000 | 1.6582 | 4.3041 |
| PAA MW 250,000 | 0.4627 | 5.5214 |
| D42 MW 5-8,000 | 0.3443 | 4.127 |

EXAMPLE 3

This is an example of the adsorption of a polyacrylic acid which has been cross linked with trivalent chronium ion, $Cr+++$.

The cross linked polyacrylic acid was prepared by adding 12 cc of 1 M chromium chloride slowly to 10 cc of 10% (active) PAA solution, dropwise with agitation. PAA samples of 2,000 and 5,000 molecular weight polyacrylic acid were used. The Cr/PAA ratio in the resulting solution was 2.5% in each case. The pH of the solution was 3. The crosslinking reaction continued overnight and the adsorption of the crosslinked PAA was tested after about 20 hours.

The adsorption of the samples thus treated was determined on Berea sand fines smaller than 325 mesh resulting from crushing Berea cores using the testing procedure described previously. X-ray analyses show that this fraction of Berea sand contains significant amounts of ilite and kaolinite.

Figure 9:
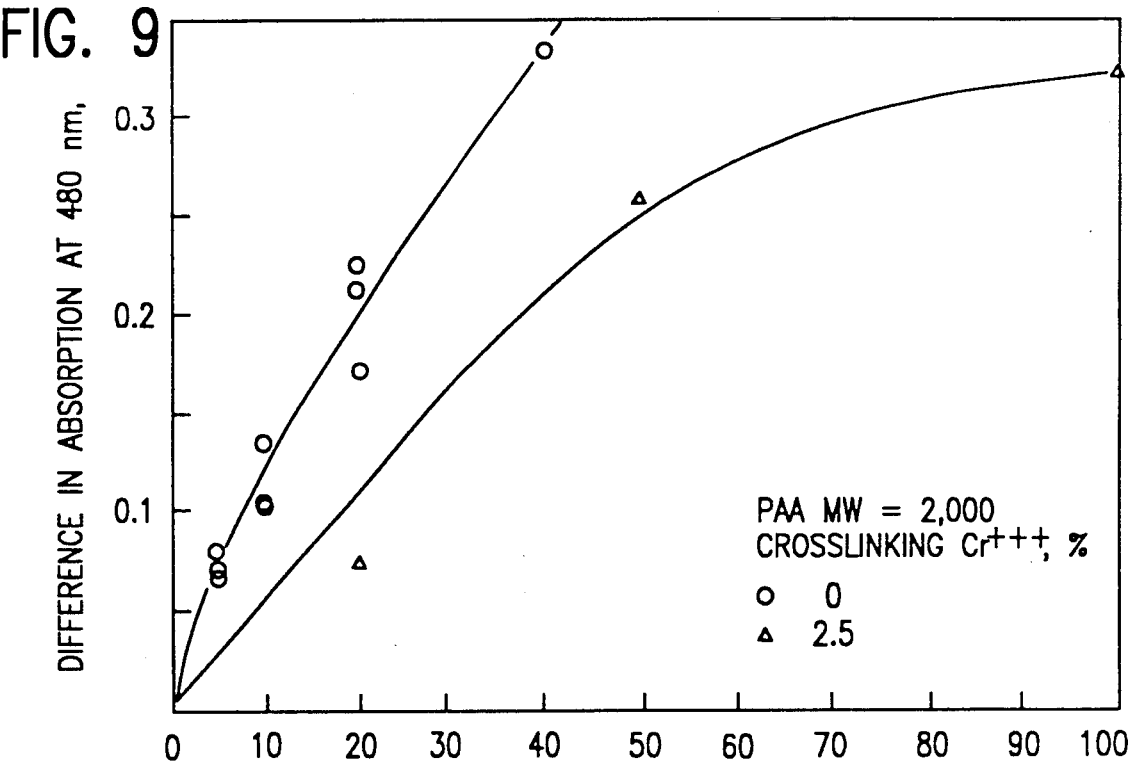
FIG. 9 is a calibration curve similar to those in FIGS. 4 to 6 for concentrations of PAA which have been crosslinked using chromium as a crosslinking agent.
Figure 10:
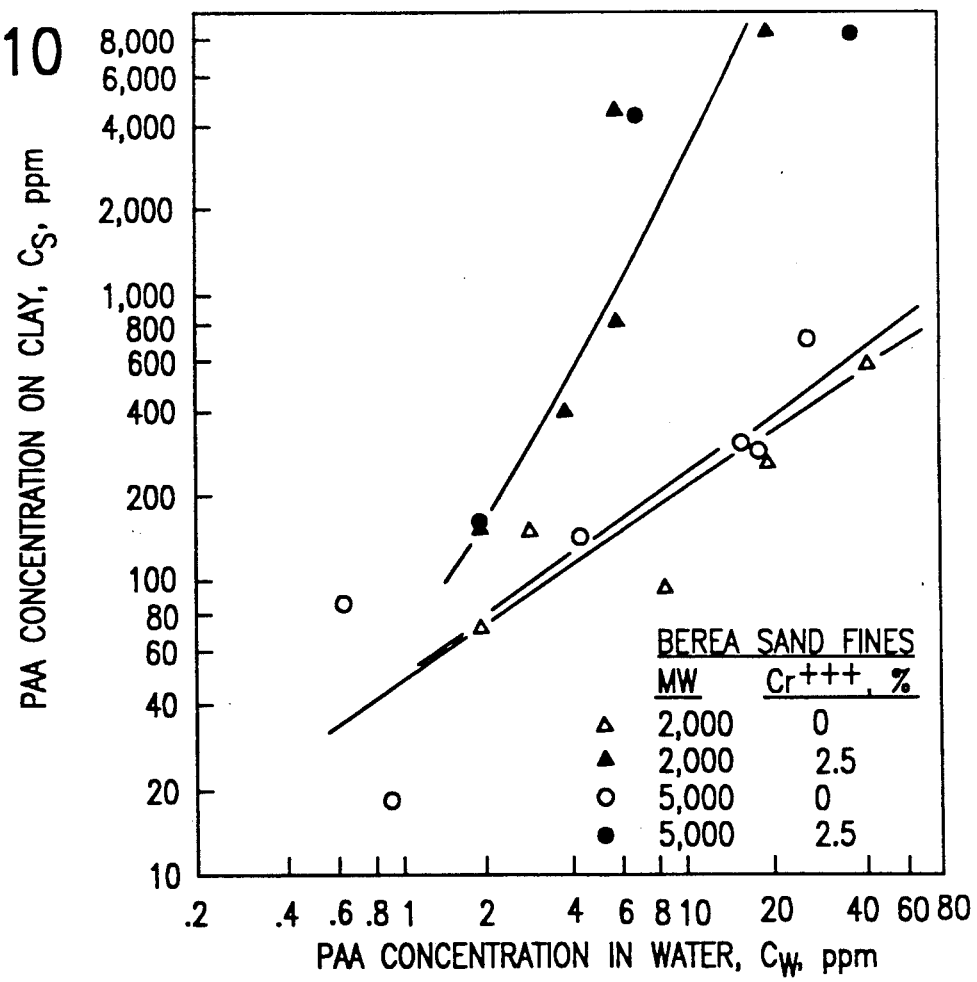
FIG. 10 is plot of equilibrium concentrations for various crosslinked inhibitors between formation water and formation sand.

The presence of the $Cr+++$ ion seems to interfere and reduce the test response so that a new calibration curve has to be established. The calibration curves with and without $Cr+++$ ion for PAA MW 2,000 are shown in FIG. 9. The adsorption isotherm is obtained by plotting the concentrations of PAA on the clay and in the aqueous solution (FIG. 10).

The adsorption of PAA on the Berea sand is increased significantly by crosslinking it with $Cr+++$. This increase in adsorption is due to crosslinking increases with the concentration of PAA in the solution (FIG. 10). For example, at PAA concentrations in solution ($C_W$ of 2 ppm, the adsorption on sand ($C_S$ increased from 75 to 170 ppm, while at $C_W$ of 20 ppm, the $C_S$ increased from 350 to 10,000 ppm.

The adsorption isotherm of $Cr+++$ crosslinked PAA becomes more favorable. For a long lasting and constant level of releasing of the inhibitors, the ideal adsorption isotherm is that the slope of $\ln C_S$ vs. $\ln C_W$ be as high as possible (FIG. 10). With such adsorption characteristics, the formation can be highly loaded to increase its capacity while the releasing is kept relatively constant at the desired level. The slope of adsorption is much higher for the PAA with $Cr+++$ crosslinking than that without crosslinking (FIG. 10).

We claim:

1. In a method for treating subterranean well bores to inhibit the deposit of scale in said formation and in said well bore wherein an aqueous solution of an inhibitor which inhibits the deposit of scale is squeezed in reverse flow from the well bore into said formation where at least a portion of said inhibitor compound is adsorbed by the sand and clay in said formation, the improvement comprising:

the use of an inhibitor comprising an aqueous solution of a water-soluble time-release agent comprising a complex of a water-soluble polyacrylic acid compound having a molecular weight from 1,000 to 15,000 cross-linked with 0.01 to 0.05 equivalents per equivalent of the polyacrylic acid of trivalent chromium ions which is adsorbed into said formation in sufficient quantity to subsequently be released into water flowing through said formation in scale-inhibiting concentrations.

2. The method of claim 1 in which the amount of inhibitor injected into the formation is from 1 to 100,000 ppmw.

3. The method of claim 2 wherein the aqueous solution is prepared from formation water.

4. The method of claim 2 wherein the injection of aqueous solution of scale inhibitor agent is followed by the injection of plain formation water.

5. The method of claim 1 in which the molecular weight of the polyacrylic acid compound is from 1,000 to 10,000.

6. The method of claim 1 in which the molecular weight of the polyacrylic acid compound is from 2,000 to 8,000.

7. The method of claim 1 in which the molecular weight of the polyacrylic acid compound is from 2,000 to 5,000.

8. The method of claim 1 in which the water-soluble polyacrylic acid compound is cross-linked with from 0.05 to 0.03 equivalents per equivalent of the polyacrylic acid of trivalent chromium ions.

9. The method of claim 1 in which the amount of inhibitor injected into the formation is from 10 to 100,000 ppmw.

10. The method of claim 1 in which the amount of solutioninjected is sufficient to extend into an area extending from 20 to 100 feet from the wellbore.

11. A method for treating the hydrocarbon- and water-producing formation surrounding a wellbore penetrating said formation to prevent the deposition of salts from water flowing through the formation into the wellbore comprising:

(a) isolating a section of the wellbore opposite the formation to be treated so that aqueous liquids can be injected down through the wellbore and into the formation;

(b) injecting into the formation an aqueous solution of scale inhibitor selected for its time release characteristics which comprises a water-soluble time-release agent comprising a complex of a water-soluble polyacrylic acid compound having a molecular weight from 1,000 to 15,000 cross-linked with 0.01 to 0.05 equivalents per equivalent of the polyacrylic acid of trivalent chromium ions (c) returning the wellbore to the normal production of hydrocarbons by the upward flow of hydrocarbons.

12. The method of claim 11 wherein the polyacrylic acid has a molecular weight of between 2,000 and 5,000.

* * * * *